United States Patent
Hickman MacCoy et al.

(10) Patent No.: US 9,689,715 B2
(45) Date of Patent: Jun. 27, 2017

(54) LIGHT SOURCE ARRAY USED IN AN ILLUMINATION PORTION OF AN OPTICAL ENCODER

(71) Applicant: Mitutoyo Corporation, Kanagawa-ken (JP)

(72) Inventors: Brynn Kristen Hickman MacCoy, Seattle, WA (US); Casey Edward Emtman, Kirkland, WA (US); Daniel John Kapner, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 244 days.

(21) Appl. No.: 14/716,760

(22) Filed: May 19, 2015

(65) Prior Publication Data

US 2016/0341576 A1 Nov. 24, 2016

(51) Int. Cl.
*G01D 5/34* (2006.01)
*G01D 5/347* (2006.01)
*G01D 5/38* (2006.01)

(52) U.S. Cl.
CPC ........... *G01D 5/3473* (2013.01); *G01D 5/347* (2013.01); *G01D 5/34707* (2013.01);
(Continued)

(58) Field of Classification Search
CPC .. G01D 5/347; G01D 5/3473; G01D 5/34707; G01D 5/34715; G01D 5/34792; G01D 5/38
(Continued)

(56) References Cited

U.S. PATENT DOCUMENTS

| 5,055,894 A | 10/1991 | Chan |
| 5,302,820 A | 4/1994 | Henshaw et al. |

(Continued)

FOREIGN PATENT DOCUMENTS

| DE | 3112525 A1 | 11/1982 |
| EP | 2 244 071 A2 | 10/2010 |

OTHER PUBLICATIONS

Extended European Search Report, dated Nov. 3, 2016, for corresponding EP Application No. 16170206.3-1568 / 3098572, 7 pages.
(Continued)

*Primary Examiner* — Georgia Y Epps
*Assistant Examiner* — Kevin Wyatt
(74) *Attorney, Agent, or Firm* — Seed IP Law Group LLP

(57) ABSTRACT

A light source array used in illumination portions for optical encoders comprising an illumination portion, a scale grating extending along a measuring direction and receiving light from the illumination portion, and a detector configuration. The light source array comprises individual sources arranged in a grid pattern and coinciding with two transverse sets of parallel grid pattern lines that have two different grid line pitches between their parallel lines. Different instances of the light source array may be mounted with different rotational orientations about an axis normal to the grid pattern, for use in different illumination portions adapted for use with respective scale gratings having different grating pitches along the measuring axis direction. By using the different respective rotational orientations, the individual sources are aligned along respective illumination source lines that are spaced apart by different respective illumination source line pitches along the measuring axis direction.

20 Claims, 7 Drawing Sheets

(52) U.S. Cl.
CPC ..... *G01D 5/34715* (2013.01); *G01D 5/34792* (2013.01); *G01D 5/38* (2013.01)

(58) Field of Classification Search
USPC ............ 250/231.13, 231.14, 231.15, 231.16, 250/231.17, 231.18
See application file for complete search history.

(56) References Cited

U.S. PATENT DOCUMENTS

| | | | |
|---|---|---|---|
| 6,906,315 | B2 | 6/2005 | Tobiason |
| 7,417,218 | B2 | 8/2008 | Yamamoto et al. |
| 7,608,813 | B1 * | 10/2009 | Milvich ............. G01D 5/34784 250/231.13 |
| 7,649,168 | B2 | 1/2010 | Hane et al. |
| 7,719,075 | B2 | 5/2010 | Speckbacher et al. |
| 2004/0217268 | A1 * | 11/2004 | Tobiason ........... G01D 5/34723 250/231.13 |
| 2010/0072456 | A1 | 3/2010 | Weston et al. |
| 2010/0243871 | A1 | 9/2010 | Hane |
| 2010/0328681 | A1 * | 12/2010 | Kapner ............. G01D 5/34715 356/616 |
| 2012/0099320 | A1 | 4/2012 | Martinez |
| 2013/0161499 | A1 | 6/2013 | Tobiason et al. |
| 2013/0264472 | A1 | 10/2013 | Schimmer et al. |

OTHER PUBLICATIONS

Cowley et al., "Fourier Images: I—The Point Source," Proc. Phys. Soc. 70(5):486-496, 1957. (18 pages).
Crespo et al., "Optical encoder based on the Lau effect," Opt. Eng. 39(3):817-824, 2000.

* cited by examiner

LIGHT SOURCE ARRAY USED IN AN ILLUMINATION PORTION OF AN OPTICAL ENCODER

TECHNICAL FIELD

The present application relates generally to precision measurement instruments and more particularly to optical displacement encoders.

BACKGROUND

Various optical displacement encoders are known that use a readhead having an optical arrangement that images a scale pattern to a photodetector arrangement in the readhead. The image of the scale pattern displaces in tandem with a scale member, and the movement or position of the displaced scale pattern image is detected with a photodetector arrangement. Optical encoders may utilize a self-imaging arrangement in order to detect a displacement of a scale member comprising a scale grating. The basic principle of self-images, also known as Talbot images, is described in the paper "Fourier Images: I—The Point Source" by Cowley, J. M., and A. F. Moodie, 1957, Proc. Phys. Soc. B, 70, 486, which is incorporated herein by reference. An exemplary optical encoder utilizing self-imaging is disclosed in U.S. Pat. No. 7,608,813 (the '813 patent), which is incorporated herein by reference in its entirety. Similar encoders may utilize self-images generated according to Lau effect principles, in two or three grating encoder arrangements. One example is disclosed in the paper "Optical Encoder Based on the Lau Effect" by Crespo et al., March 2000, Opt. Eng. 39(3), 817-824. Other optical encoders may utilize moiré imaging techniques. An exemplary optical encoder utilizing moiré imaging techniques is disclosed in U.S. Pat. App. No. US20130161499A1, which is incorporated herein by reference in its entirety.

Typical encoder configurations such as those disclosed in the '813 patent rely on an illumination grating with a fixed pitch, and thus cannot utilize interchangeable illumination portion components for different pitches of illumination gratings. In various encoder configurations it is desirable to provide a compact readhead which may be manufactured in a cost-efficient manner with simple and interchangeable components.

SUMMARY

A light source array used in an illumination portion of an optical encoder is disclosed. The optical encoder comprises the illumination portion, a scale grating extending along a measuring axis direction and arranged to receive light from the illumination portion, and a detector configuration arranged to receive light from the scale grating. The light source array comprises individual sources arranged in an approximately planar two-dimensional (2D) grid pattern and located to coincide with a set of first grid pattern lines parallel to a first grid axis, and furthermore located to coincide with a set of second grid pattern lines parallel to a second grid axis that is transverse to the first grid axis. Members of the set of first grid pattern lines are spaced apart by a first grid line pitch P1 along a direction perpendicular to the first grid pattern lines, and members of the set of second grid pattern lines are spaced apart by a second grid line pitch P2 along a direction perpendicular to the second set of grid pattern lines. The light source array is configured to be mounted with a first rotational orientation about an axis normal to the 2D grid pattern in a first illumination portion for use with a scale grating having a first scale grating pitch SGP1 along the measuring axis direction, wherein when using the first rotational orientation in the first illumination portion the individual sources are aligned along illumination source lines that are perpendicular to the measuring axis direction and the illumination source lines are spaced apart by a first illumination source line pitch IP1 along the measuring axis direction. The light source array is furthermore configured to be mounted with a second rotational orientation about an axis normal to the 2D grid pattern in a second illumination portion for use with a scale grating having a second scale grating pitch SGP2 along the measuring axis direction, wherein when using the second rotational orientation in the second illumination portion the individual sources are aligned along illumination source lines that are perpendicular to the measuring axis direction and the illumination source lines are spaced apart by a second illumination source line pitch IP2 along the measuring axis direction. The first illumination source line pitch IP1 and the second illumination source line pitch IP2 are different.

In various embodiments, a method for providing first and second optical encoders is disclosed. The method comprises a step of providing first and second instances of a light source array, wherein individual sources are arranged in an approximately planar two-dimensional (2D) grid pattern and located to coincide with a set of first grid pattern lines parallel to a first grid axis, and furthermore located to coincide with a set of second grid pattern lines parallel to a second grid axis that is transverse to the first grid axis. The set of first grid pattern lines are spaced apart by a first grid line pitch P1 along a direction perpendicular to the first grid pattern lines, and the set of second grid pattern lines are spaced apart by a second grid line pitch P2 along a direction perpendicular to the second grid pattern lines. The light source array is configured to be mounted with a first rotational orientation about an axis normal to the 2D grid pattern in a first illumination portion for use with a scale grating having a first scale grating pitch SGP1 along the measuring axis direction, wherein when using the first rotational orientation in the first illumination portion the individual sources are aligned along illumination source lines that are perpendicular to the measuring axis direction and the illumination source lines are spaced apart by a first illumination source line pitch IP1 along the measuring axis direction. The light source array is furthermore configured to be mounted with a second rotational orientation about an axis normal to the 2D grid pattern in a second illumination portion for use with a scale grating having a second scale grating pitch SGP2 along the measuring axis direction, wherein when using the second rotational orientation in the second illumination portion the individual sources are aligned along illumination source lines that are perpendicular to the measuring axis direction and the illumination source lines are spaced apart by a second illumination source line pitch IP2 along the measuring axis direction. The first illumination source line pitch IP1 and the second illumination source line pitch IP2 are different in the light source array. The method further comprises a step of including the first instance of the light source array in a first optical encoder comprising: the first instance of the light source array mounted with the first rotational orientation in the first illumination portion; a first scale grating having the first scale grating pitch SGP1, the first scale grating extending along the measuring axis direction and arranged to receive light from the first illumination portion; and a first detector configuration arranged to receive light from the first scale grating. The method further comprises a step of including the second instance of the light source array in a second optical encoder comprising: the second instance of the light source array mounted with the second rotational orientation in the second illumination portion; a second scale grating having the second scale grating pitch SGP2, the second scale grating extending along the measuring axis direction and arranged to receive light from the second illumination portion; and a second detector configuration arranged to receive light from the second scale grating.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
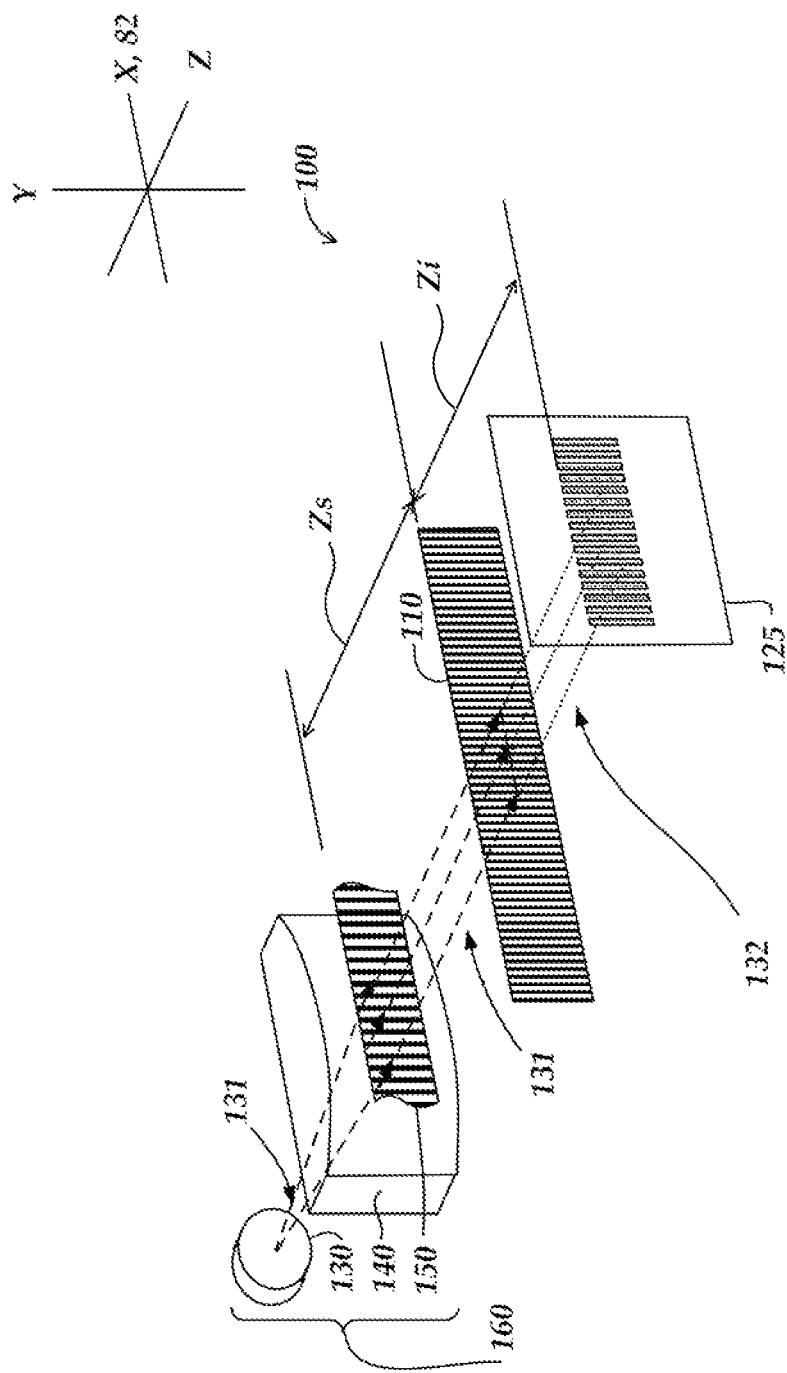
FIG. 1 is a partially schematic exploded diagram of a prior art optical encoder configuration.

FIG. 1 is a partially schematic exploded diagram of a prior art optical encoder configuration 100, which may operate according to known "self imaging" principles, in various embodiments. Certain aspects of the encoder configuration 100 are similar to encoder configurations described in the '813 patent and may be understood by analogy. As shown in FIG. 1, the encoder configuration 100 includes a scale grating 110, an illumination portion 160 and a detector configuration 125. The illumination portion 160 comprises a light source 130, a lens 140 and an illumination grating 150. The scale grating 110 is separated from the illumination portion 160 by a source gap distance Zs. The detector configuration 125 is separated from the scale grating 110 by a distance Zi. In some embodiments, the light source 130 is an LED.

FIG. 1 shows orthogonal X, Y, and Z directions, according to a convention used herein. The X and Y directions are parallel to the plane of the scale grating 110, with the X direction parallel to the intended measuring axis direction MA (e.g., perpendicular to elongated pattern elements of the scale grating 110). The Z direction is normal to the plane of the scale grating 110.

In operation, light 131 emitted from the light source 130 is partially or fully collimated by the lens 140, over a beam area sufficient to illuminate the scale grating 110. The light 131 passes through the grating structure of the illumination grating 150 to provide an array of partially coherent illumination sources at the grating openings, selected to illuminate the scale grating 110 according to known self-imaging illumination principles. When the scale grating 110 is illuminated, it outputs a spatially modulated light pattern (e.g., interference fringe light from diffracted orders, in some embodiments) as scale light 132 to the detector configuration 125. The encoder configuration 100 is configured according to known methods such that several diffracted orders interact to produce a self-image (e.g., a Talbot image or a Fresnel image) at the plane of the detector configuration 125.

In various applications, the detector configuration 125 and the illumination portion 160 are mounted in a fixed relationship relative to one another, e.g., in a readhead or gauge housing (not shown), and are guided along the measuring axis relative to the scale grating 110 by a bearing system, according to known techniques. The scale grating 110 may be attached to a moving stage, or a gauge spindle, or the like, in various applications. The configuration shown in FIG. 1 is a transmissive configuration. The scale grating 110 comprises light blocking portions and light transmitting portions (e.g., fabricated on a transparent substrate using known thin-film patterning techniques, or the like) that output the spatially modulated light patterns to the detector tracks by transmission. It will be appreciated that similar components may be arranged in reflective embodiments, wherein the illumination portion 160 and the detector configuration 125 are arranged on the same side of the scale grating 110, and positioned for angled illumination and reflection if necessary, according to known techniques.

It should be appreciated that the encoder configuration 100 may be utilized in a Lau effect encoder configuration. In some embodiments incorporating a Lau effect encoder configuration, the lens 140 may be eliminated, as such configurations do not require a highly collimated light source.

Figure 2:
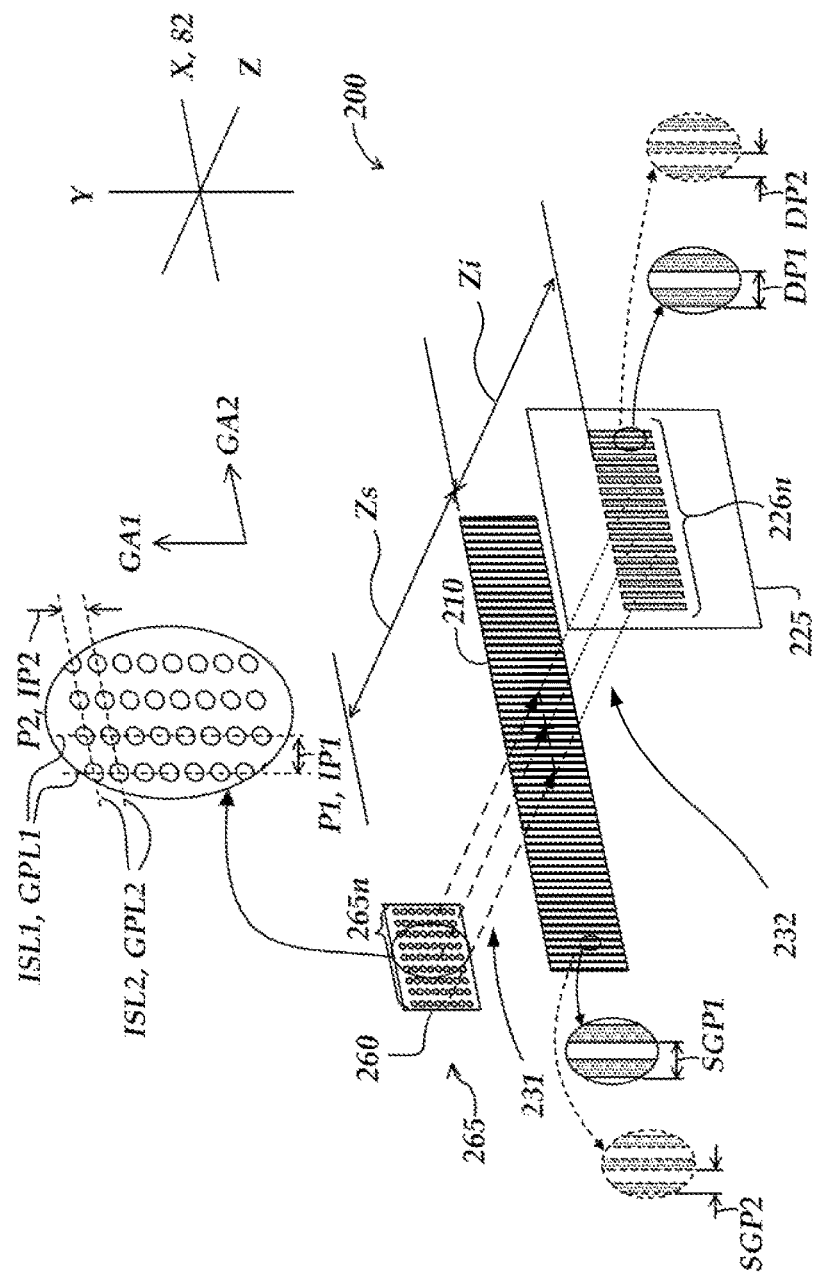
FIG. 2 is a partially schematic exploded diagram of an optical encoder configuration using an embodiment of a light source array as disclosed herein.

FIG. 2 is a partially schematic exploded diagram of an optical encoder configuration 200 using an embodiment of a light source array as disclosed herein, which may operate according to known "self imaging" principles, in various embodiments. Certain elements of the encoder configuration 200 numbered 2XX may be similar or identical to elements numbered 1XX using similar "XX" numerical suffixes in FIG. 1, and may be understood by analogy. As shown in FIG. 2, the encoder configuration 200 includes a scale grating 210, an illumination portion 260 and a detector configuration 225. It will be understood that the illumination portion 260 and the detector configuration 225 include electrical connections (not shown) for connecting power, control and/or data signals to and from the various components, according to known methods.

The illumination portion 260 comprises an embodiment of a light source array 265 configured to be mounted in different orientations in different illumination portions, according to principles disclosed herein. In particular, the light source array 265 comprises individual sources 265n arranged in an approximately planar two-dimensional (2D) grid pattern and located to coincide with a set of first grid pattern lines GPL1 parallel to a first grid axis GA1, and furthermore located to coincide with a set of second grid pattern lines GPL2 parallel to a second grid axis GA2 that is transverse to the first grid axis GA1. In some embodiments, the individual sources 265n may be LED sources. Members of the set of first grid pattern lines GPL1 are spaced apart by a first grid line pitch P1 along a direction perpendicular to the first grid pattern lines GPL1, and members of the set of second grid pattern lines GPL2 are spaced apart by a second grid line pitch P2 along a direction perpendicular to the second set of grid pattern lines. The first illumination source line pitch IP1 and the second illumination source line pitch IP2 are different. It should be appreciated that only two of the first grid pattern lines GPL1 and two of the second grid pattern lines GPL2 are marked in FIGS. 3A and 3B as exemplary grid pattern lines, although it may be understood that the grid pattern lines are regularly spaced along the light source array 265.

As outlined previously, the light source array 265 is configured such that a first instance of its design may be mounted with a first rotational orientation about an axis normal to the 2D grid pattern (i.e., in the Z direction) in a first illumination portion (i.e., the illumination portion 260) for use with the scale grating 210 which has a first scale grating pitch SGP1 along the measuring axis direction MA. When using the first rotational orientation in the illumination portion 260, the individual sources 265n are aligned along illumination source lines ISL1 that are perpendicular to the measuring axis direction MA and the illumination source lines are spaced apart by a first illumination source line pitch IP1 along the measuring axis direction MA. The light source array 265 is furthermore configured such that a second instance of its design may be mounted with a second rotational orientation about an axis normal to the 2D grid pattern (i.e., in the Z direction) in a second illumination portion for use with a scale grating having a second scale grating pitch SGP2 along the measuring axis direction MA. When using the second rotational orientation in the second illumination portion the individual sources 265n are aligned along illumination source lines ISL2 that are perpendicular to the measuring axis direction MA and the illumination source lines ISL2 are spaced apart by a second illumination source line pitch IP2 along the measuring axis direction MA. The detector configuration 225 may then comprise detector portions 226n which are arranged according to a detector pitch DP2 which corresponds to a pitch of the spatially modulated light 232. In FIG. 2, the second scale grating pitch SGP2 and the second detector pitch DP2 are shown in dashed lines to indicate that they represent an alternative configuration different from a configuration of SGP1 and DP1. Examples of using three instances of an analogous light source array, in different orientations in three different illumination portions, is described in greater detail below with reference to FIGS. 3A-3C.

In various embodiments of the optical encoder configuration 200, the scale grating 210 extends along the measuring axis direction 82 and is arranged to receive light 231 from the illumination portion 260. The scale grating 210 is separated from the illumination portion 260 by a source gap distance Zs. The detector configuration 225 is separated from the scale grating 210 by a distance Zi and is arranged to receive spatially modulated light 232 from the scale grating 210. The detector configuration 225 comprises detector portions 226n which are arranged according to a detector pitch DP1 which corresponds to a pitch of the spatially modulated light 232. It should be appreciated that in various embodiments, the detector pitch DP1 may be understood to be a distance between the detector portions 226n which correspond to the same phase of the spatially modulated light 232. For simplicity, FIG. 2 shows the detector portions 226n spaced according to a single phase. However, in various embodiments, the detector portions 226n may be arranged for quadrature detection or three-phase detection. The optical encoder configuration 200 includes no light blocking element between the light source array 265 and the scale grating 210.

In some embodiments, the pitches IP1, SGP1, and DP1 may satisfy an expression:

$$IP1 = DP1*SGP1/(DP1-SGP1) \qquad \text{Eq. 1}$$

In some embodiments, the illumination portion 260 may output light with a wavelength λ, the first instance of the light source array may be spaced at a distance Zs from the first scale grating along a direction normal to the first scale grating, and the distance Zs may satisfy an expression:

$$Zs = 2*IP1*SGP1/\lambda \qquad \text{Eq. 2}$$

In some embodiments, the distance Zi may satisfy an expression:

$$Zi = Zs*SGP1/(IP1-SGP1) \qquad \text{Eq. 3}$$

In one exemplary embodiment, a first encoder configuration may comprise a first instance of a light source array design mounted with a first rotational orientation about an axis normal to the 2D grid pattern in a first illumination portion with a first illumination source line pitch IP1 which is 40 μm, a scale grating with scale grating pitch SGP1 which is 10 μm, and a detector portion with a detector pitch DP1 which is 13.3 μm. The first encoder configuration may be configured with a distance Zs which is 1.98 mm and a distance Zi which is 0.66 mm. A second encoder configuration may comprise a second instance of the same light source array design mounted with a second rotational orientation about an axis normal to the 2D grid pattern in a second illumination portion with a second illumination source line pitch IP2 which is 23 μm, a scale grating with scale grating pitch SGP2 which is 8 μm, and a detector portion with a detector pitch DP2 which is 12.3 μm. The second encoder configuration may be configured with a distance Zs which is 0.91 mm and a distance Zi which is 0.49 mm.

While the optical encoder configuration 200 is a transmissive type of encoder configuration, it should be appreciated that the illumination portion 260 may be suitably adapted to a reflective type of encoder configuration. Additionally, although particular dimensions have been described that may be useful in an embodiment which is a self imaging type optical encoder, the illumination portion 260 may also be suitably adapted to a moiré imaging type of encoder configuration, such as that disclosed in U.S. Pat. App. No. US20130161499A1, for example, which is hereby incorporated herein by reference in its entirety.

Figure 3A:
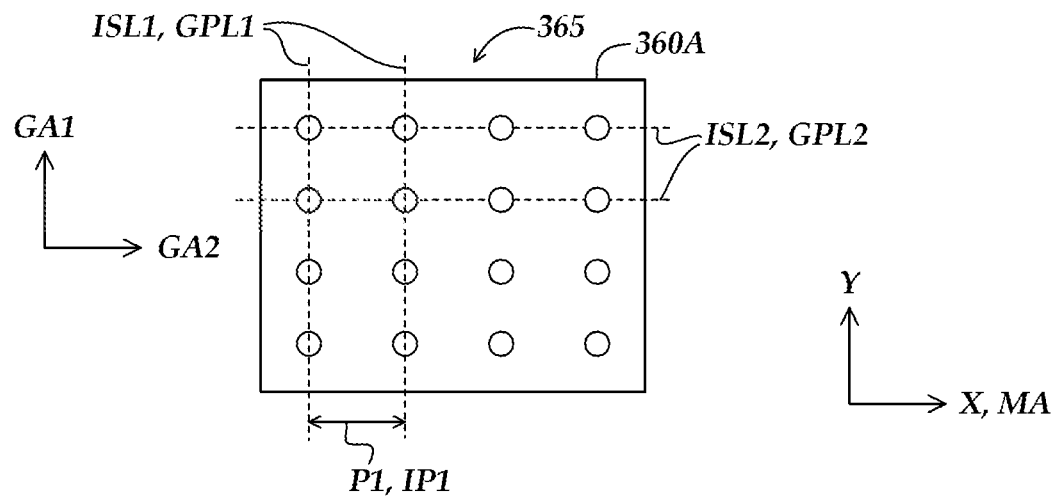
FIGS. 3A, 3B and 3C are diagrams showing illumination portions for three optical encoders using three rotational orientations of a first embodiment of a light source array as disclosed herein.
Figure 3B:
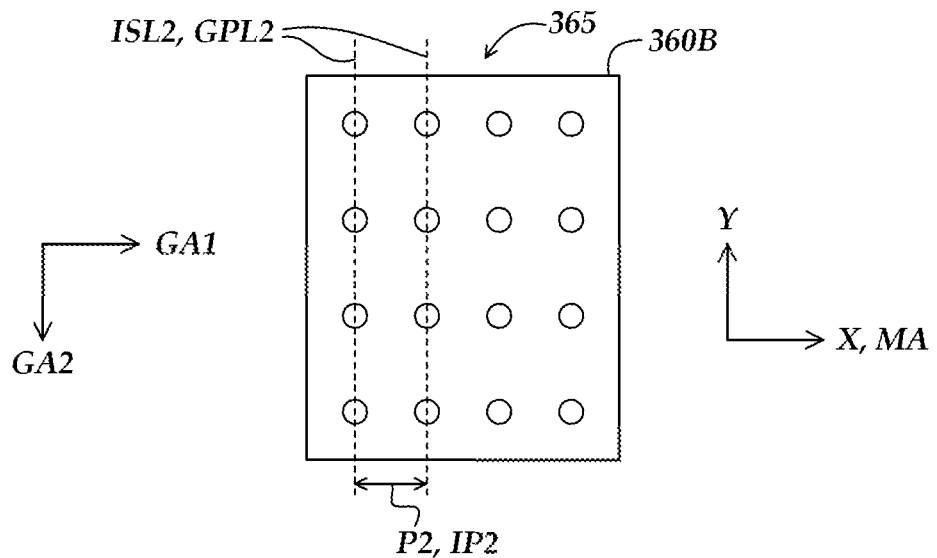
Figure 3C:
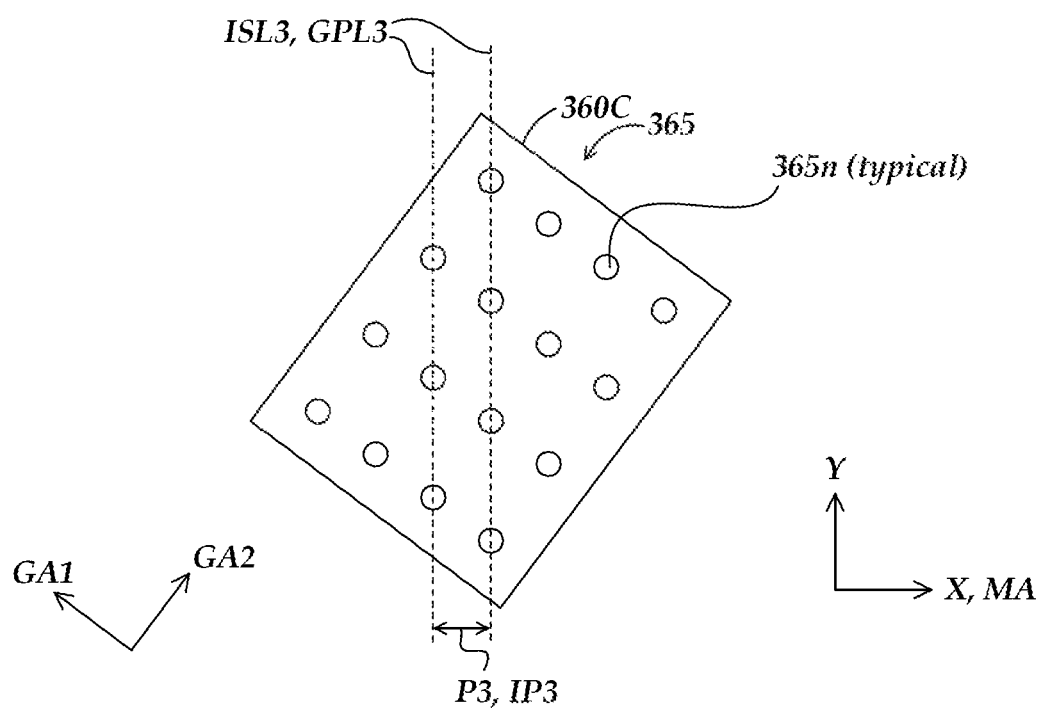

FIGS. 3A, 3B and 3C are diagrams showing an illumination portion 360A, an illumination portion 360B and an illumination portion 360C for three optical encoders using three rotational orientations of respective instances of a first embodiment of a light source array 365. The illumination portion 360A is similar to, and is usable in place of, the illumination portion 260 in the encoder configuration 200. The light source array 365 comprises individual sources 365n arranged along the measuring axis direction MA, 82. It will be understood that the light source array 365 also includes electrical connections (not shown) for supplying power to the device, and may also include various signal and control lines and/or control circuits, according to known techniques, if desired. It will be understood that the light source array 365 may be mounted to a circuit board or the like (not shown) in the various illumination portions 360A, 360B and/or 360C, in a desired mounting orientation, using known techniques.

As shown in FIG. 3A, for a first instance of the light source array 365, using the first rotational orientation as illustrated aligns the first grid axis GA1 perpendicular to the measuring axis direction MA, and the resulting illumination source lines ISL1 perpendicular to the measuring axis direction MA therefore have a first illumination source line pitch IP1 (along the direction of the measuring axis MA) which is the same as the first grid line pitch P1. As shown in FIG. 3B, for a second instance of the light source array 365, using the second rotational orientation as illustrated aligns the second grid axis GA2 perpendicular to the measuring axis direction MA, and the resulting illumination source lines ISL2 perpendicular to the measuring axis direction MA therefore have a second illumination source line pitch IP2 (along the direction of the measuring axis MA) which is the same as the second grid line pitch P2. As shown in FIG. 3C, for a third instance of the light source array 365, using the third rotational orientation as illustrated aligns neither the first grid axis GA1 nor the second grid axis GA2 perpendicular to the measuring axis direction MA. Rather, "diagonal" sets of the individual illumination sources 365n are aligned along the illumination source lines ISL3 that are perpendicular to the measuring axis direction. The illumination source line pitch IP3 (which is the same as the third grid line pitch P3 spanning between third grid pattern lines GPL3) is therefore different than the first grid line pitch P1 and is different than the second grid line pitch P2.

It should be appreciated that while the light source array 365 is arranged as a rectangular lattice, other arrangements may be suitable according to the principles described herein. For example, a light source array may alternatively be arranged as a hexagonal lattice, an oblique lattice or a rhombic lattice, and may still be used according to the principles disclosed herein.

Using a light source array such as that illustrated in the various illumination portions 360A, 360B and 360C reduces the number of elements in an encoder readhead, providing a more compact single element for an illumination portion, rather than requiring a light source, lens and illumination "mask" grating such as the light source 130, the lens 140 and the illumination grating 150 of the illumination portion 160 shown in FIG. 1, to achieve a similar effect. Furthermore, using multiple instances of the same light source array design in the various illumination portions 360A, 360B and 360C allows cost reduction by allowing increased light source array fabrication quantities and a simplified component inventory to be used when manufacturing a product line of encoders with a variety of operating parameters such as different scale pitches and or resolutions.

Figure 4A:
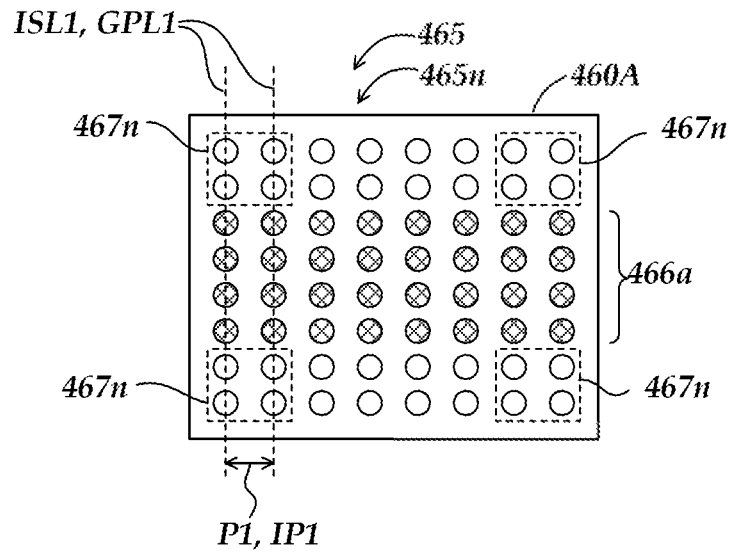
FIGS. 4A and 4B are diagrams showing illumination portions for two optical encoders using two rotational orientations of a second embodiment of a light source array as disclosed herein.
Figure 4B:
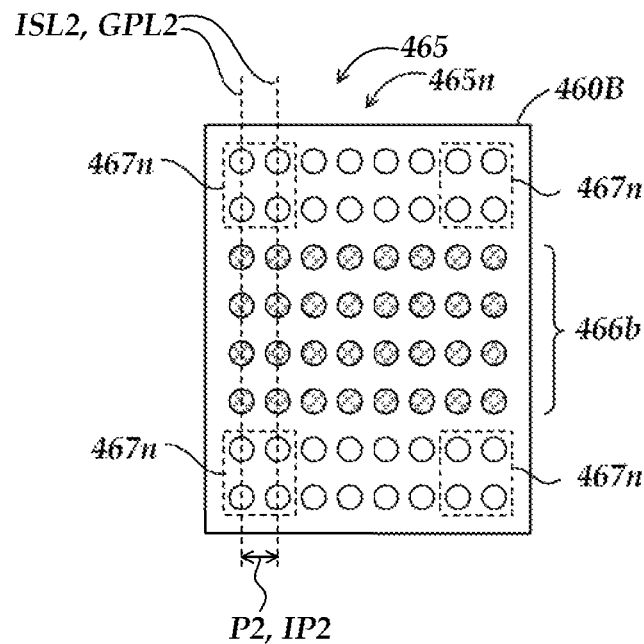

FIGS. 4A and 4B are diagrams showing illumination portions 460A and 460B, respectively, usable for two different optical encoders. The illumination portions 460A and 460B use two different rotational orientations of respective instances of a second embodiment of a light source array 465. The light source array 465 comprises individual sources 465n. As shown in FIGS. 4A and 4B, the light source array 465 is configured to provide at least a first addressable set of individual sources 466a and a second addressable set of individual sources 466b. The individual sources 465n are arranged in an approximately planar two-dimensional (2D) grid pattern and located to coincide with a set of first grid pattern lines GPL1 parallel to a first grid axis GA1, and furthermore located to coincide with a set of second grid pattern lines GPL2 parallel to a second grid axis GA2 that is transverse to the first grid axis GA1. Members of the set of first grid pattern lines GPL1 are spaced apart by a first grid line pitch P1 along a direction perpendicular to the first grid pattern lines GPL1, and the set of second grid pattern lines are spaced apart by a second grid line pitch P2 along a direction perpendicular to the second set of grid pattern lines. The light source array 465 is configured to be mounted with a first rotational orientation about an axis normal to the 2D grid pattern (i.e., in the Z direction) in the first illumination portion 460A for use with a scale grating which has a first scale grating pitch SGP1 along the measuring axis direction MA. When using the first rotational orientation in the illumination portion 460A, the individual sources 465n are aligned along illumination source lines ISL1 that are perpendicular to the measuring axis direction MA and the illumination source lines are spaced apart by a first illumination source line pitch IP1 along the measuring axis direction MA. As shown in FIG. 4B, the light source array 465 is furthermore configured to be mounted with a second rotational orientation about an axis normal to the 2D grid pattern (i.e., in the Z direction) in the second illumination portion 460B for use with a scale grating having a second scale grating pitch SGP2 along the measuring axis direction MA.

In the embodiment shown in FIGS. 4A and 4B, the first optical encoder and the second optical encoder are configured to leave some of the individual sources 465n inactive during operation. More specifically, the first optical encoder is configured to leave the individual sources 465n which are not part of the first addressable set of individual sources 466a inactive during operation, and the second optical encoder is configured to leave the individual sources 465n which are not part of the second addressable set of individual sources 466b inactive during operation. Leaving some of the individual sources inactive allows an optical encoder to save power by not activating individual sources which do not contribute light to a field of view of a detector portion of the optical encoder. It should also be appreciated that some rows of the individual source 465n along the measuring axis direction MA may be set to be inactive (i.e., some rows may be "skipped") in order to adjust a level of intensity of source light from the light source array 465.

FIG. 4A shows a set of individual sources 467n of the light source array 465. The set of individual sources 467n comprises adjacent individual sources which are inactive in both the illumination portion 460A and the illumination portion 460B. It should therefore be appreciated that in some embodiments, the light source array 465 may not include the set of individual sources 467n as they contribute light to neither the illumination portion 460A nor the illumination portion 460B.

It is advantageous that some of the individual sources 465n are active in both the illumination portion 460A and the illumination portion 460B, and therefore the light source array 465 requires fewer individual sources 465n. In some embodiments which include addressable sets of individual sources according to the principles disclosed herein, at least 50% of the individual sources may be used in both the first and second optical encoders.

In some embodiments which include addressable sets of individual sources, the inactive individual sources may comprise sets of individual sources aligned along respective illumination source lines, such that a spacing between illumination source lines corresponding to active individual sources is equal to n*IP1 along the measuring axis direction, where n is an integer. More specifically, in some embodiments, a light source array may be configured to leave one or more grid pattern lines inactive, i.e., to "skip" grid pattern lines to provide a desired illumination source line pitch.

Assembly costs may also be reduced as sets of the individual sources 465n may be activated or deactivated along the measuring axis direction MA and/or perpendicular to the measuring axis direction MA as necessary to correct alignment with respect to a detector configuration in lieu of mechanically aligning the entire illumination portion 460A or the illumination portion 460B during assembly.

Figure 5A:
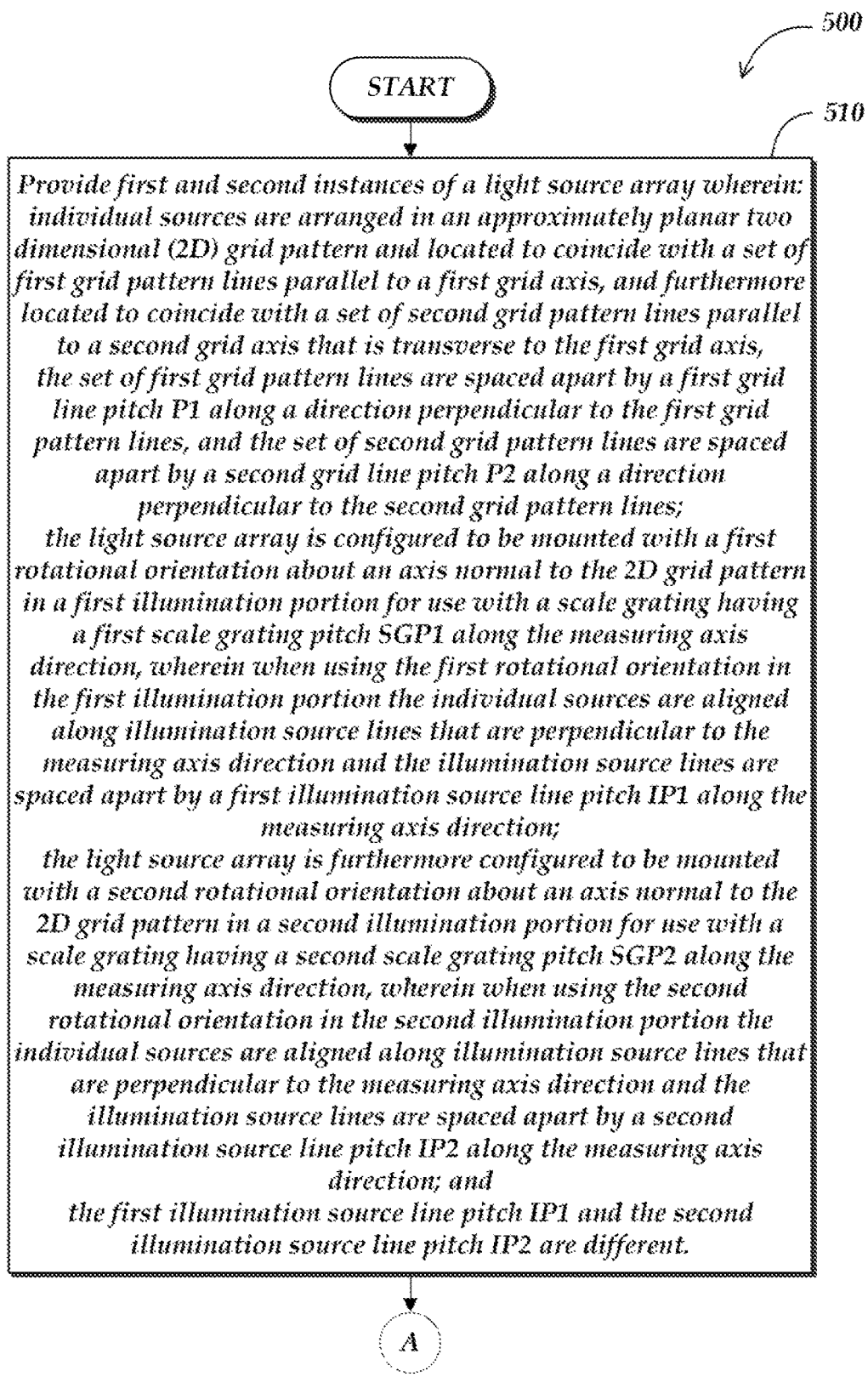
FIGS. 5A and 5B show a diagram illustrating a method for providing first and second optical encoders.
Figure 5B:
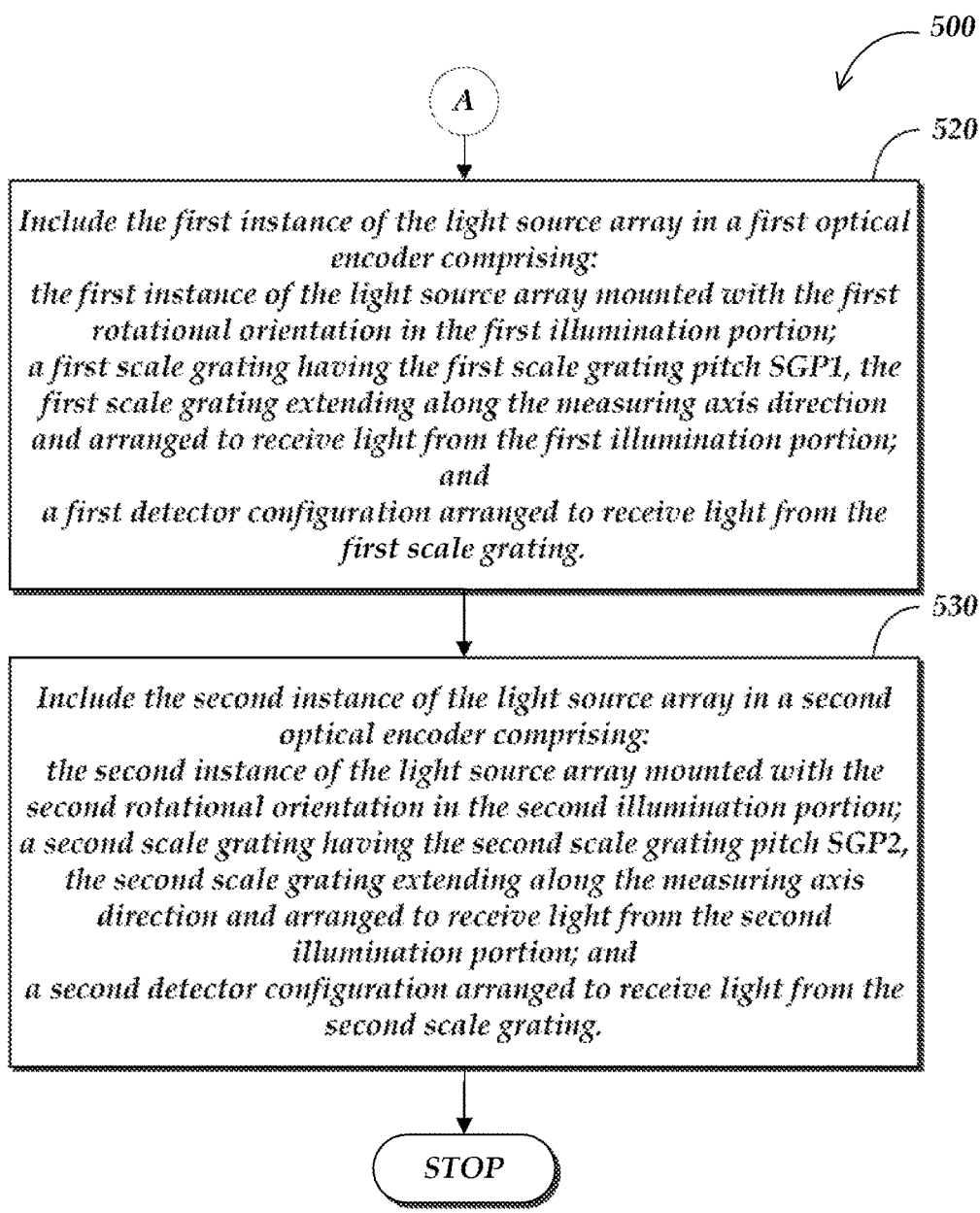

FIGS. 5A and 5B show a diagram 500 of a method for providing first and second optical encoders. In FIG. 5A, at a block 510, first and second instances of a light source array are provided. Individual sources are arranged in an approximately planar two-dimensional (2D) grid pattern and located to coincide with a set of first grid pattern lines parallel to a first grid axis, and furthermore located to coincide with a set of second grid pattern lines parallel to a second grid axis that is transverse to the first grid axis. The set of first grid pattern lines are spaced apart by a first grid line pitch P1 along a direction perpendicular to the first grid pattern lines, and the set of second grid pattern lines are spaced apart by a second grid line pitch P2 along a direction perpendicular to the second grid pattern lines. The light source array is configured such that a first instance of the light source array may be mounted with a first rotational orientation about an axis normal to the 2D grid pattern in a first illumination portion for use with a scale grating having a first scale grating pitch SGP1 along the measuring axis direction, wherein when using the first rotational orientation in the first illumination portion the individual sources are aligned along illumination source lines that are perpendicular to the measuring axis direction and the illumination source lines are spaced apart by a first illumination source line pitch IP1 along the measuring axis direction. The light source array is furthermore configured such that a second instance of the light source array may be mounted with a second rotational orientation about an axis normal to the 2D grid pattern in a second illumination portion for use with a scale grating having a second scale grating pitch SGP2 along the measuring axis direction, wherein when using the second rotational orientation in the second illumination portion the individual sources are aligned along illumination source lines that are perpendicular to the measuring axis direction and the illumination source lines are spaced apart by a second illumination source line pitch IP2 along the measuring axis direction. The first illumination source line pitch IP1 and the second illumination source line pitch IP2 are different. The method continues to a reference block A which is continued in FIG. 5B. In FIG. 5B, the method continues from the reference block A to a block 520. At the block 520, the first instance of the light source array is included in a first optical encoder comprising: the first instance of the light source array mounted with the first rotational orientation in the first illumination portion; a first scale grating having the first scale grating pitch SGP1, the first scale grating extending along the measuring axis direction and arranged to receive light from the first illumination portion; and a first detector configuration arranged to receive light from the first scale grating. At a block 530, the second instance of the light source array is included in a second optical encoder comprising: the second instance of the light source array mounted with the second rotational orientation in the second illumination portion; a second scale grating having the second scale grating pitch SGP2, the second scale grating extending along the measuring axis direction and arranged to receive light from the second illumination portion; and a second detector configuration arranged to receive light from the second scale grating. The first instance of the first illumination portion configuration is operated to illuminate the first scale grating using the first addressable set of the individual sources in the first optical encoder and the second instance of the first illumination portion configuration is operated to illuminate the second scale grating using the second addressable set of the individual sources in the second optical encoder.

In some embodiments, mounting the light source array with the first rotational orientation may align the first grid axis perpendicular to the measuring axis direction, and the first illumination source line pitch IP1 may be the same as the first grid line pitch P1.

In some embodiments, mounting the light source array with the second rotational orientation may align the second grid axis perpendicular to the measuring axis direction, and the second illumination source line pitch IP2 may be the same as the second grid line pitch P2.

In some embodiments, mounting the light source array with the first rotational orientation may align neither the first grid axis nor the second grid axis perpendicular to the measuring axis direction, and the first illumination source line pitch IP1 may be different than the first grid line pitch P1 and different than the second grid line pitch P2.

In some embodiments, at least 50% of the individual sources may be used in both the first and second optical encoders.

In some embodiments, mounting the light source array with the first rotational orientation may provide the illumination source lines spaced apart by the first illumination source line pitch IP1 along the measuring axis direction. The first scale grating may have the first scale grating pitch SGP1 along the measuring axis direction. The first detector configuration may comprise a set of optical detector portions having a detector pitch DP1 along the measuring axis direction. The pitches IP1, SGP1, and DP1 may satisfy the expression IP1=DP1*SGP1/(DP1−SGP1). Mounting the light source array with the second rotational orientation may provide the illumination source lines spaced apart by the second illumination source line pitch IP2 along the measuring axis direction. The second scale grating may have the second scale grating pitch SGP2 along the measuring axis direction. The second detector configuration may comprise a set of optical detector portions having a detector pitch DP2 along the measuring axis direction. The pitches IP2, SGP2, and DP2 may satisfy the expression IP2=DP2*SGP2/(DP2−SGP2). In some embodiments, the first illumination portion may output light with a wavelength $\lambda$ and the first instance of the light source array may be spaced at a distance Zs1 from the first scale grating along a direction normal to the first scale grating, and the distance Zs1 may satisfy an expression Zs1=2*IP1*SGP1/$\lambda$. The second illumination portion may output light with the wavelength $\lambda$ and the second instance of the light source array may be spaced at a distance Zs2 from the second scale grating along a direction normal to the second scale grating, and the distance Zs2 may satisfy an expression Zs2=2*IP2*SGP2/$\lambda$. In some embodiments, the first scale grating may be spaced at a distance Zi1 from the first detector configuration along a direction normal to the first scale grating, and the distance Zi1 may satisfy an expression Zi1=Zs1*SGP1/(IP1−SGP1). The second scale grating may be spaced at a distance Zi2 from the second detector configuration along a direction normal to the second scale grating, and the distance Zi2 may satisfy an expression Zi2=Zs2*SGP2/(IP2−SGP2).

While various embodiments have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

What is claimed is:

1. A light source array used in an illumination portion of an optical encoder which comprises the illumination portion, a scale grating extending along a measuring axis direction and arranged to receive light from the illumination portion, and a detector configuration arranged to receive light from the scale grating, wherein:

the light source array comprises individual sources arranged in an approximately planar two-dimensional (2D) grid pattern and located to coincide with a set of first grid pattern lines parallel to a first grid axis, and furthermore located to coincide with a set of second grid pattern lines parallel to a second grid axis that is transverse to the first grid axis;

members of the set of first grid pattern lines are spaced apart by a first grid line pitch P1 along a direction perpendicular to the first grid pattern lines, and members of the set of second grid pattern lines are spaced apart by a second grid line pitch P2 along a direction perpendicular to the second set of grid pattern lines;

the light source array is configured to be mounted with a first rotational orientation about an axis normal to the 2D grid pattern in a first illumination portion for use with a scale grating having a first scale grating pitch SGP1 along the measuring axis direction, wherein when using the first rotational orientation in the first illumination portion the individual sources are aligned along illumination source lines that are perpendicular to the measuring axis direction and the illumination source lines are spaced apart by a first illumination source line pitch IP1 along the measuring axis direction;

the light source array is furthermore configured to be mounted with a second rotational orientation about an axis normal to the 2D grid pattern in a second illumination portion for use with a scale grating having a second scale grating pitch SGP2 along the measuring axis direction, wherein when using the second rotational orientation in the second illumination portion the individual sources are aligned along illumination source lines that are perpendicular to the measuring axis direction and the illumination source lines are spaced apart by a second illumination source line pitch IP2 along the measuring axis direction; and the first illumination source line pitch IP1 and the second illumination source line pitch IP2 are different.

2. The light source array of claim 1, wherein a first instance of the light source array is included in a first optical encoder comprising:

the first instance of the light source array mounted with the first rotational orientation in the first illumination portion;

a first scale grating having the first scale grating pitch SGP1, the first scale grating extending along the measuring axis direction and arranged to receive light from the first illumination portion; and a first detector configuration arranged to receive light from the first scale grating.

3. The light source array of claim 2, wherein using the first rotational orientation aligns the first grid axis perpendicular to the measuring axis direction, and the first illumination source line pitch IP1 is the same as the first grid line pitch P1.

4. The light source array of claim 2, wherein using the first rotational orientation aligns neither the first grid axis nor the second grid axis perpendicular to the measuring axis direction, and the first illumination source line pitch IP1 is different than the first grid line pitch P1 and is different than the second grid line pitch P2.

5. The light source array of claim 2, wherein a second instance of the light source array is included in a second optical encoder comprising:

the second instance of the light source array mounted with the second rotational orientation in the second illumination portion;

a second scale grating having the second scale grating pitch SGP2, the second scale grating extending along the measuring axis direction and arranged to receive light from the second illumination portion; and a second detector configuration arranged to receive light from the second scale grating.

6. The light source array of claim 5, wherein at least 50% of the individual sources are used in both the first and second optical encoders.

7. The light source array of claim 2, wherein the first optical encoder is configured to leave some of the individual sources inactive during operation.

8. The light source array of claim 7, wherein the inactive individual sources comprise sets of individual sources aligned along respective illumination source lines, such that a spacing between illumination source lines corresponding to active individual sources is equal to n*IP1 along the measuring axis direction, where n is an integer.

9. The light source array of claim 7, wherein the inactive individual sources comprise sets of adjacent individual sources.

10. The light source array of claim 2, wherein:

using the first rotational orientation in the first illumination portion provides the illumination source lines spaced apart by the first illumination source line pitch IP1 along the measuring axis direction; the first scale grating has the first scale grating pitch SGP1 along the measuring axis direction;

the first detector configuration comprises a set of optical detector portions having a detector pitch DP1 along the measuring axis direction; and the pitches IP1, SGP1, and DP1 satisfy an expression IP1=DP1*SGP1/(DP1−SGP1).

11. The light source array of claim 10, wherein the first illumination portion outputs light with a wavelength $\lambda$ and the first instance of the light source array is spaced at a distance Zs from the first scale grating along a direction normal to the first scale grating, and the distance Zs satisfies an expression Zs=2*IP1*SGP1/$\lambda$.

12. The light source array of claim 10, wherein the first scale grating is spaced at a distance Zi from the first detector configuration along a direction normal to the first scale grating, and the distance Zi satisfies an expression Zi=Zs*SGP1/(IP1−SGP1).

13. A method for providing first and second optical encoders, the method comprising:

providing first and second instances of a light source array wherein:

individual sources are arranged in an approximately planar two-dimensional (2D) grid pattern and located to coincide with a set of first grid pattern lines parallel to a first grid axis, and furthermore located to coincide with a set of second grid pattern lines parallel to a second grid axis that is transverse to the first grid axis, the set of first grid pattern lines are spaced apart by a first grid line pitch P1 along a direction perpendicular to the first grid pattern lines, and the set of second grid pattern lines are spaced apart by a second grid line pitch P2 along a direction perpendicular to the second grid pattern lines;

the light source array is configured to be mounted with a first rotational orientation about an axis normal to the 2D grid pattern in a first illumination portion for use with a scale grating having a first scale grating pitch SGP1 along the measuring axis direction, wherein when using the first rotational orientation in the first illumination portion the individual sources are aligned along illumination source lines that are perpendicular to the measuring axis direction and the illumination source lines are spaced apart by a first illumination source line pitch IP1 along the measuring axis direction;

the light source array is furthermore configured to be mounted with a second rotational orientation about an axis normal to the 2D grid pattern in a second illumination portion for use with a scale grating having a second scale grating pitch SGP2 along the measuring axis direction, wherein when using the second rotational orientation in the second illumination portion the individual sources are aligned along illumination source lines that are perpendicular to the measuring axis direction and the illumination source lines are spaced apart by a second illumination source line pitch IP2 along the measuring axis direction; and the first illumination source line pitch IP1 and the second illumination source line pitch IP2 are different;

including the first instance of the light source array in a first optical encoder comprising:

the first instance of the light source array mounted with the first rotational orientation in the first illumination portion;

a first scale grating having the first scale grating pitch SGP1, the first scale grating extending along the measuring axis direction and arranged to receive light from the first illumination portion; and a first detector configuration arranged to receive light from the first scale grating; and including the second instance of the light source array in a second optical encoder comprising:

the second instance of the light source array mounted with the second rotational orientation in the second illumination portion;

a second scale grating having the second scale grating pitch SGP2, the second scale grating extending along the measuring axis direction and arranged to receive light from the second illumination portion; and a second detector configuration arranged to receive light from the second scale grating.

14. The method of claim 13, wherein mounting the light source array with the first rotational orientation aligns the first grid axis perpendicular to the measuring axis direction, and the first illumination source line pitch IP1 is the same as the first grid line pitch P1.

15. The method of claim 13, wherein mounting the light source array with the second rotational orientation aligns the second grid axis perpendicular to the measuring axis direction, and the second illumination source line pitch IP2 is the same as the second grid line pitch P2.

16. The method of claim 13, wherein mounting the light source array with the first rotational orientation aligns neither the first grid axis nor the second grid axis perpendicular to the measuring axis direction, and the first illumination source line pitch IP1 is different than the first grid line pitch P1 and is different than the second grid line pitch P2.

17. The method of claim 13, wherein at least 50% of the individual sources are used in both the first and second optical encoders.

18. The method of claim 13, wherein:

mounting the light source array with the first rotational orientation provides the illumination source lines spaced apart by the first illumination source line pitch IP1 along the measuring axis direction;

the first scale grating has the first scale grating pitch SGP1 along the measuring axis direction;

the first detector configuration comprises a set of optical detector portions having a detector pitch DP1 along the measuring axis direction;

the pitches IP1, SGP1, and DP1 satisfy the expression IP1=DP1*SGP1/(DP1−SGP1);

mounting the light source array with the second rotational orientation provides the illumination source lines spaced apart by the second illumination source line pitch IP2 along the measuring axis direction;

the second scale grating has the second scale grating pitch SGP2 along the measuring axis direction;

the second detector configuration comprises a set of optical detector portions having a detector pitch DP2 along the measuring axis direction; and the pitches IP2, SGP2, and DP2 satisfy the expression IP2=DP2*SGP2/(DP2−SGP2).

19. The method of claim 18, wherein:

the first illumination portion outputs light with a wavelength λ and the first instance of the light source array is spaced at a distance Zs1 from the first scale grating along a direction normal to the first scale grating, and the distance Zs1 satisfies an expression Zs1=2*IP1*SGP1/λ; and the second illumination portion outputs light with the wavelength λ and the second instance of the light source array is spaced at a distance Zs2 from the second scale grating along a direction normal to the second scale grating, and the distance Zs2 satisfies an expression Zs2=2*IP2*SGP2/λ.

20. The method of claim 18, wherein:

the first scale grating is spaced at a distance Zi1 from the first detector configuration along a direction normal to the first scale grating, and the distance Zi1 satisfies an expression Zi1=Zs1*SGP1/(IP1−SGP1); and the second scale grating is spaced at a distance Zi2 from the second detector configuration along a direction normal to the second scale grating, and the distance Zi2 satisfies an expression Zi2=Zs2*SGP2/(IP2−SGP2).

* * * * *